_United States Patent Office_

3,534,336
Patented Oct. 13, 1970

3,534,336
DEVIATION INDICATION SYSTEM EMPLOYING PRESCRIBED AND MEASURED VALUES
Gerhard Kaps, Hamburg, Germany, assignor, by mesne assignments, to U.S. Philips Corporation, New York, N.Y., a corporation of Delaware
Filed Apr. 3, 1967, Ser. No. 627,927
Claims priority, application Germany, Apr. 7, 1966, P 39,158; Nov. 2, 1966, P 40,716
Int. Cl. G06f 9/00
U.S. Cl. 340—168                    5 Claims

ABSTRACT OF THE DISCLOSURE

A digital control circuit for producing time intervals proportional to control deviations between actual and reference control signals provided with an arrangement of reversible counters and associated logic circuits for receiving pulses representing sampling time and preselected difference signals and routing them to sum and difference counters for producing the desired control difference indication signals.

---

This invention relates to an improvement in or a modification of the invention described and claimed in copending U.S. patent application Ser. No. 544,007 filed Apr. 20, 1966. As described therein, a control system uses frequency and time proportional signals and measured quantities are represented by frequency-analogous signals. The prescribed quantities are set and/or introduced in the form of digits, especially for ratio controls and, for the processing of measured and prescribed quantities, each control circuit includes only one counter and means for controlling it and for producing time intervals proportional to the deviations from the controlled quantities, the signs of these deviations being taken into account.

The operation of this arrangement, shown in FIG. 1, will now be described.

Figure 2A:
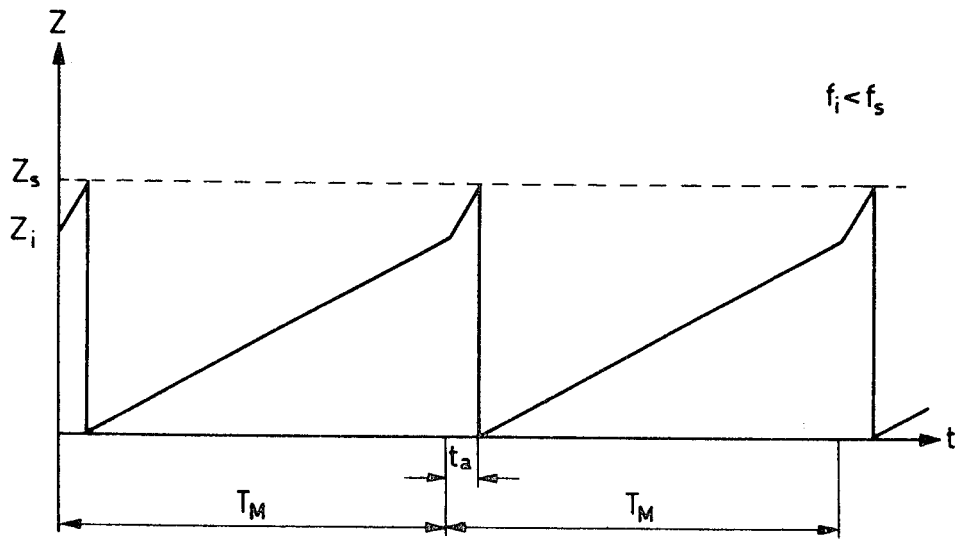

Synchronized pulses at the measured frequency (measured quantity) $f_i$ are applied to input $E_{f1}$ and supplied through a summation device S and an anticoincidence stage A to the forward input $E_V$ of a difference counter Z. Assuming bistable trigger circuits $FF_1$ and $FF_2$ to be initially in the rest condition shown, and-gates $G_S$ and $G_{V1}$ are prepared. When the measured quantity $f_i$ is smaller than its prescribed value $f_s$, the difference counter Z will not have yet counted to the prescribed value predetermined in a preselection device SE when a synchronized pulse produced by a time base T appears. A clock pulse coincident with the time-base pulse causes the circuit $FF_1$ to change its condition. Consequently, "1" potential is applied to the output $A_V$ of the and-gate $G_{V1}$. Through an and-gate $G_{V2}$, which is controlled by $G_{V1}$ and by a trigger circuit $FF_3$, a pulse sequence of frequency $f_o = f_{p/2}$ appears at the second input of the summation device S and this device adds this pulse sequence to the measured pulse sequence. As a result the counter Z counts forward according to a frequency $f_{p/2} + f_i$. When the prescribed value set in SE is reached, this causes $FF_1$ to change back to the initial rest condition, the gate $G_{V1}$ to be closed through an inverter stage $N_1$, and the counter Z to be reset to zero through an and-gate $G_A$. Then the measured quantity only is introduced and counted in the counter until the appearance of the next time-base pulse again initiates the described process. The time interval $t_a$ proportional to the control deviation is derived from the output $A_V$ of the gat $G_{V1}$. With a constant control deviation in the steady state, the state of the counter Z has the variation with time shown in FIG. 2a.

Figure 2B:
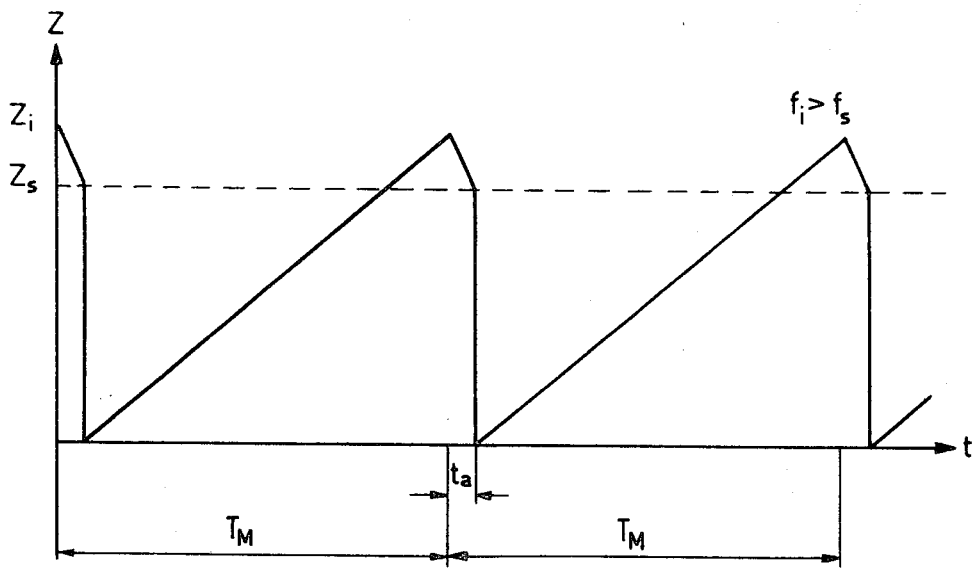

Next, we will consider the case where the measured quantity $f_i$ is greater than its prescribed value $f_s$. It is again assumed that the bistable trigger circuit $FF_1$ and $FF_2$ initially are in the conditions shown. By introducing the measured frequency $f_i$ into the counter Z, the prescribed value of the counter contents, which value is predetermined in the preselection device SE, is exceeded each time before a time-base pulse appears. Through $G_S$ the resulting "1" potential set up at the output of SE during the interval between two measured-frequency pulses causes $FF_2$ to be changed over by the clock pulse and its output $C_2$ is marked. When the time base pulse is received, the circuit $FF_1$ is caused by the clock-pulse to change its condition, so that the gate $G_A$ is prepared and the and-gate $G_{R1}$ is opened. Through the and-gate $G_{R2}$, which is controlled by $G_{R1}$ and a trigger circuit $FF_3$, pulses at the pulse sequence frequency $f_o = f_{p/2}$ are applied to the backward input of the counter Z. As it is assumed that $f_o$ is greater than $f_i$, the counter counts backward at a frequency corresponding to the difference $f_{p/2} - f_i$. When the counter has counted down to the prescribed value preset in SE, this results in that through $N_1$, $G_{R1}$ and $G_{R2}$ backward counting is stopped, through $G_A$, $FF_2$ is returned to the initial condition, the counter is reset to zero and $FF_1$ is returned to the initial condition. Then the counter counts forward at the measured frequency $f_i$ until the prescribed value is reached, and the described process is again initiated. The time interval $t_a$ which is proportional to the control deviation is now derived from the output $A_R$ of the gate $G_{R1}$. The variation of the contents of the counter Z with time is shown in principle in FIG. 2b for the steady state with a constant control deviation.

When there is no control deviation, the counter Z reaches the prescribed value preset in SE exactly at the instant at which a time base pulse is received. In this event, the counter is immediately reset to zero through the and-gate $G_2$, while $FF_1$ is prevented from changing condition through $N_1$ and the and-gate $G_1$. The circuit $FF_2$, which is prepared through $G_S$, is caused to change condition by the clock pulse, but after the zero-setting of the counter it is immediately returned to its initial condition.

In the above described circuit arrangement, however, only prescribed values other than zero can be preset in the preselection device SE. If the prescribed value zero is preset, both preparing inputs of the trigger circuit $FF_2$ are given "1" potential as long as the counter Z is at zero and as soon as $FF_1$ is in the initial condition. The circuit $FF_2$ is caused to change condition at the clock pulse frequency. The appearance of a measured-frequency pulse, that is to say $f_i > f_s$, terminates the changing over of $FF_2$. In this process the output $\overline{C}_2$ may accidentally remain marked, so that owing to the next time-base pulse, the counter does not count backward at the difference frequency $f_{p/2} - f_i$ but forward at the sum frequency $f_{p/2} + f_i$ to its maximum capacity and thus to zero. This means that statistically an indication is given of a control deviation in the wrong direction and with a wrong value. Moreover, the statistically occurring coincidences of the output pulses of the summation device S with the zero-setting signals for the counter Z give rise to counting errors which result in wrong output signals at the output $A_V$.

It is an object of the present invention to eliminate these limitations. According to the invention, for this purpose, the means for controlling the counter and for producing time intervals proportional to the control deviations, while taking the signs into account, the signs are arranged so that the pulses of a time base which determines the sampling time are directly applied to a preparing input of a bistable trigger circuit. The second preparing input of the trigger is connected to the output of a preselection device, which serves to introduce the prescribed values and is controlled by the output of the difference counter. The outputs of this first bistable trigger circuit, which is connected through two and-gates to the output of the preselection device, controls the preparing inputs of the second bistable trigger circuit, one of the outputs of the first bistable trigger circuit, through a preparing input, directly triggers a third bistable trigger circuit which delivers one half of the clock-pulse frequency and opens two further and-gates which are prepared by the outputs of the second bistable trigger circuit and, in common, by the output of a nand-gate, which in turn relates the output signals of the third bistable trigger circuit to the reset-to-zero signal for the difference counter. The outputs of the last-mentioned and-gates control two further and-gates, the inputs of which are connected in common to that output of the third bistable trigger circuit which in the rest condition is marked. The output signals of one and-gate are applied directly and those of the other through a summation device to the inputs of an anticoincidence element preceding the difference counter. In the summation device the output signals of one and-gate are added to the measured-frequency pulses and related to the reset-to-zero signals for the difference counter, these reset-to-zero signals being produced by the and-gate the input of which is connected to that output of the first bistable trigger circuit which is not marked in the rest-condition and to the output of the preselection device.

Figure 1:
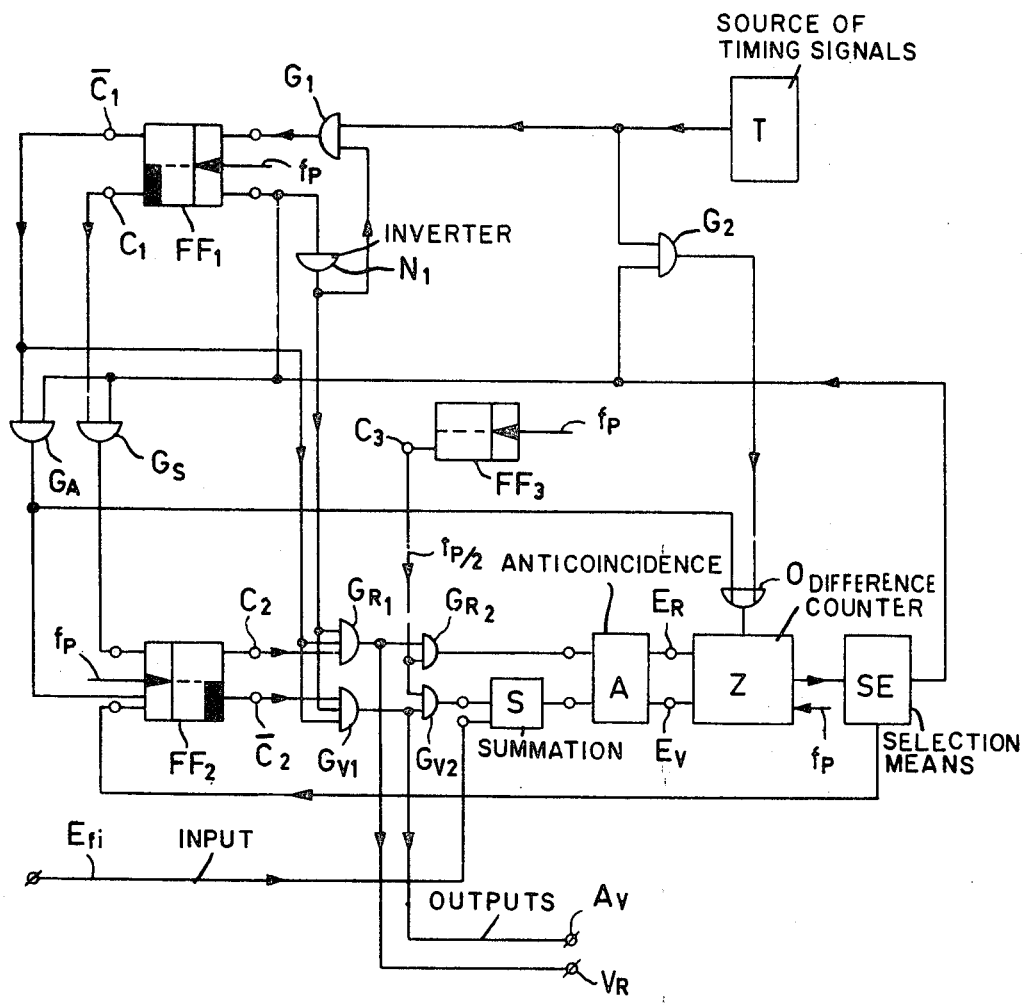
Figure 4:
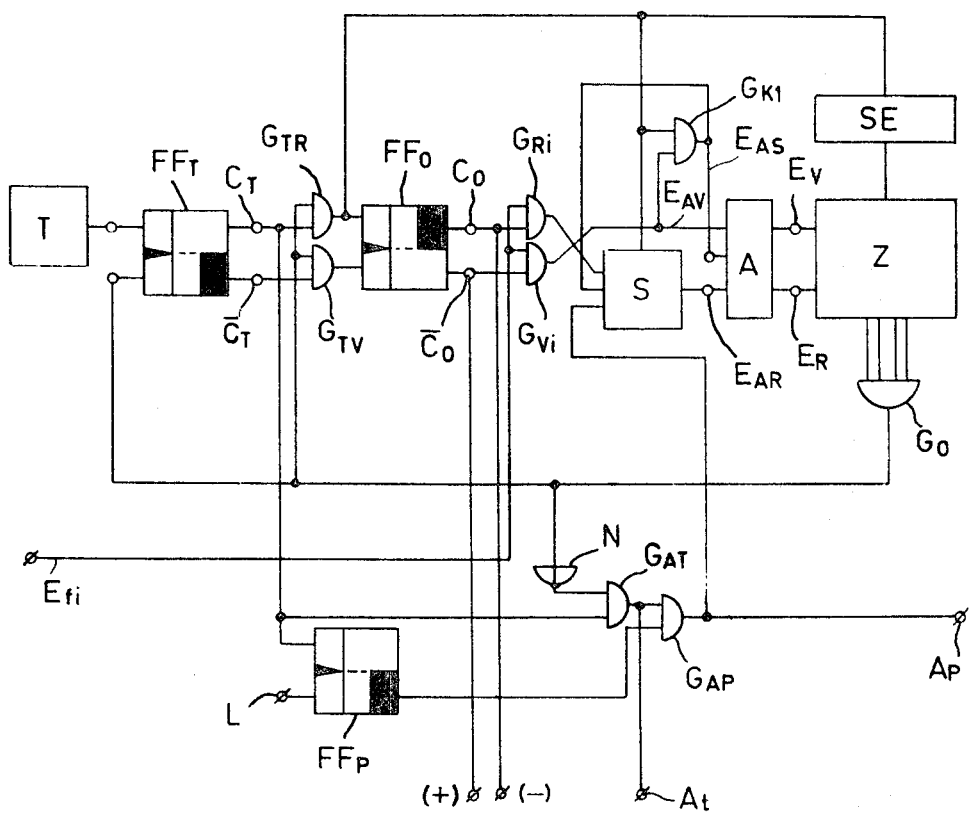
Figure 5A:
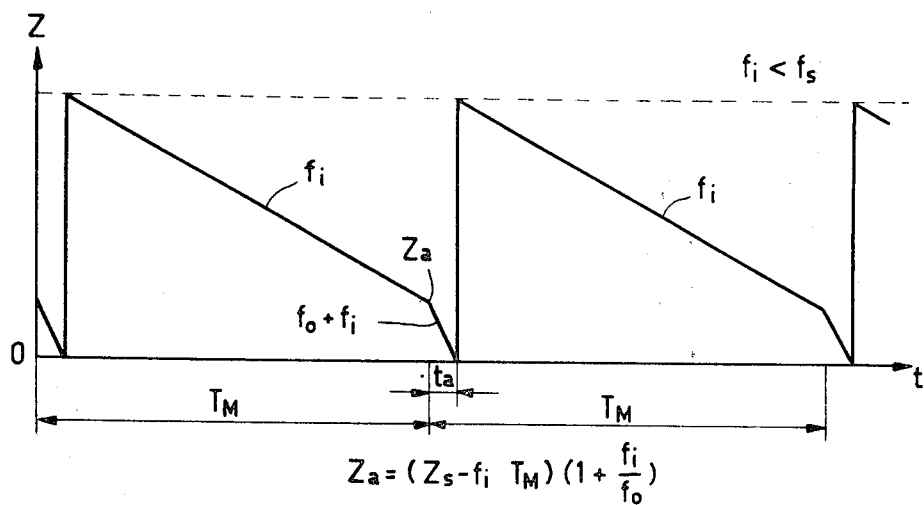
Figure 5B:
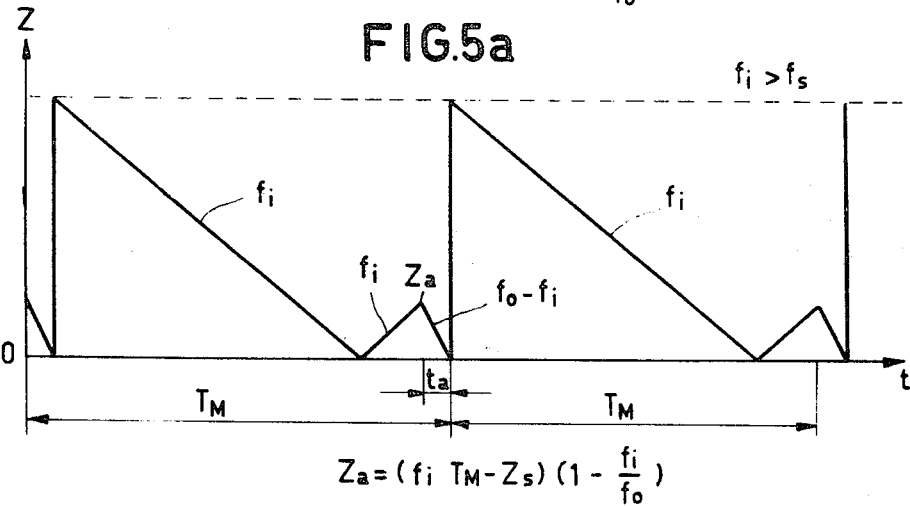
Figure 6:
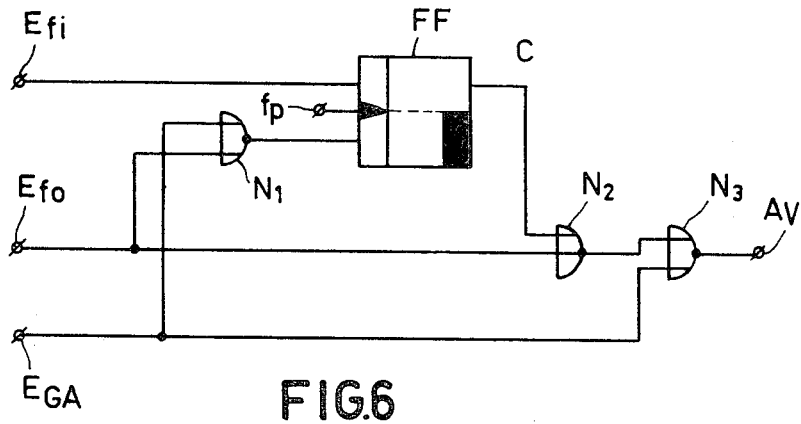

In order that the invention may readily be carried out, embodiments thereof will now be described, by way of example, with reference to the accompanying drawings, in which FIG. 1 is the circuit diagram of a control arrangement, FIG. 2 shows in principle the variation of the counter contents with time in the steady state; (a) when the measured value is smaller than the prescribed value; and (b) when the measured value is greater than the prescribed value, FIG. 3 is a circuit diagram of a control arrangement according to the invention, FIG. 4 is a circuit diagram of a modification of the control arrangement according to the invention, FIGS. 5a and 5b illustrate the variation of the counter contents with time in the steady state for the arrangement shown in FIG. 4, and FIG. 6 is a circuit diagram of an embodiment of the summation device.

Figure 3:
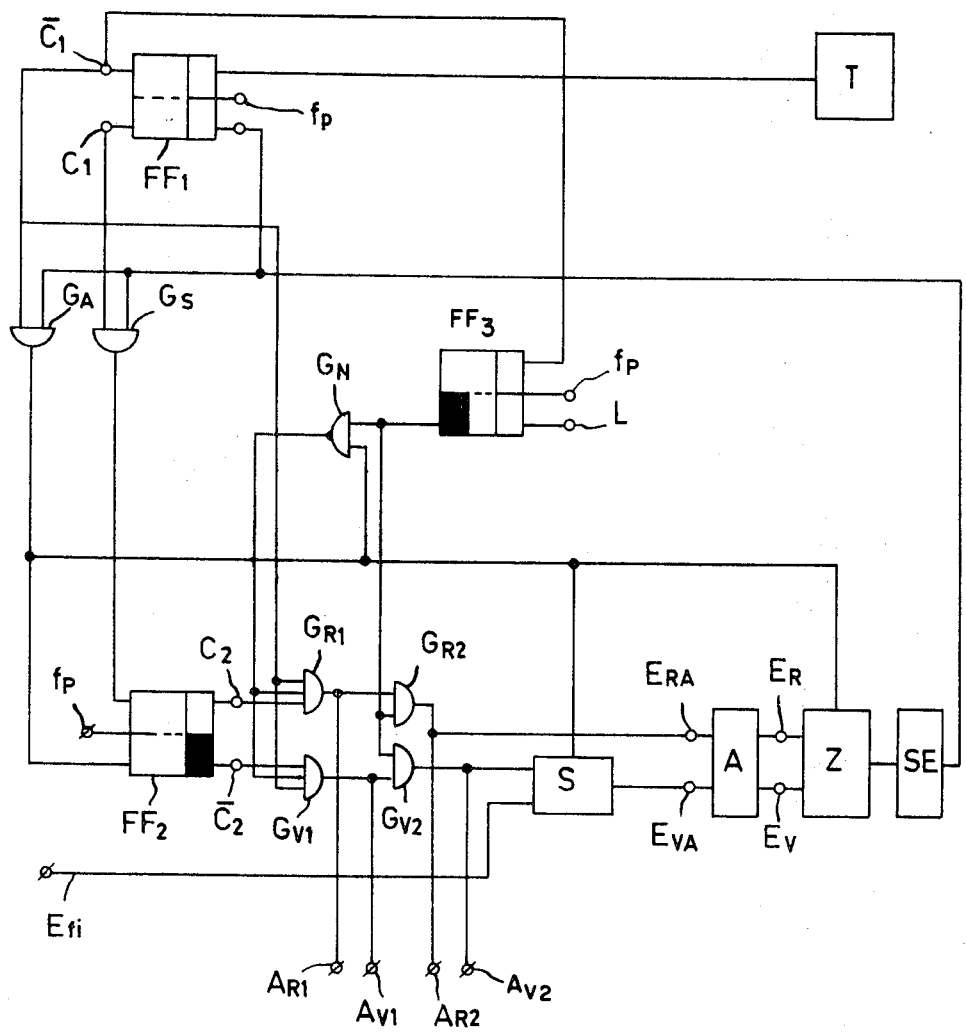

In the circuit arrangement shown in FIG. 3, the pulses at the measured frequency (measured quantity) $f_i$ which are synchronized with the clock-pulse are applied to the input $E_{fi}$ of a summation device S the output of which is connected to the forward input $E_{VA}$ of the anticoincidence element A preceding the difference counter Z. It is assumed that the bistable trigger circuits $FF_1$ and $FF_2$ and $FF_3$ are in the rest condition shown. As a result the and-gates $G_S$, $G_{V2}$ and $G_{R2}$ are prepared and the output of the nand-gate $G_N$ is at "1"-potential. When the measured frequency $f_i$ is smaller than its prescribed value $f_s$, on the appearance of a time-base pulse the difference counter Z has not yet reached the prescribed value stored in the preselection device. The change of condition of the trigger circuit $FF_1$ initiated by the clock pulse coincident with the time-base pulse causes the and-gate $G_{V1}$ to be opened and "1"-potential to be set up at the second preparing input of the trigger circuit $FF_3$. As a result pulses at the frequency $f_0=f_{p/2}$ are applied to the summation device S through the and-gate $G_{V2}$. The difference counter Z counts forward at the frequency $f_{p/2}+f_i$ until the prescribed value set in the preselection device SE is reached. When the prescribed value is reached, this prepares the return of $FF_1$ to the initial condition and hence the blocking of the gate $G_{V1}$ and, through the and-gate $G_A$, the resetting to zero of the difference counter. When the prescribed value is reached simultaneously with the production of an output signal by $FF_3$, the and-gate $G_{V1}$ is immediately blocked through the nand-gate $G_N$ so as to prevent this pulse from reaching the counter. However, when the prescribed value is reached simultaneously with the appearance of an output pulse of the summation device S derived from the measured quantity, this pulse has to be stored intermediately, being introduced and counted in the forward direction when the difference counter has been reset to zero. The intermediate storage takes place in the summation device S to which for this purpose the output signals of the gate $G_A$ are applied through a third input. When the counter Z has been reset to zero, only the pulse sequence at the measured frequency is counted in the forward direction until the next time-base pulse causes a repetition of the described process. Time intervals proportional to the control deviation will be derived from the output $A_{V1}$ of the gate $G_{V1}$ and pulse trains proportional to the control deviation from the output $A_{V2}$ of the gate $G_{V2}$. With a constant control deviation, the contents of the counter Z in the steady state vary with time in the manner shown in principle in FIG. 2a.

When the measured quantity $f_i$ is greater than its prescribed value $f_s$, the counter reaches the prescribed value preset in SE each time before the appearance of a time-base pulse. Starting from the initial position of the bistable trigger circuit which is shown in the figure, this reaching of the prescribed value causes the trigger circuit $FF_2$ to change its condition through the and-gate $G_S$. Thus, it is no longer the gate $G_{V1}$ but the gate $G_{R1}$ which is prepared. The time-base pulse again causes the trigger circuit $FF_1$ to change its condition, "1"-potential being set up at the output $\bar{C}_1$. As a result, the gate $G_{R1}$ is opened and $FF_3$ is prepared for a change in condition at clock-pulse frequency. Now the pulses of frequency $f_0=f_{p/2}$ are applied through $G_{R2}$ to the backward input of the counter Z, so that it counts backward at a frequency corresponding to the difference $f_{p/2}-f_i$. When the prescribed counter reading preset in SE is reached again, this prepares the return of $FF_1$ and, through the Gate $G_A$, the return of $FF_2$ and the resetting to zero of the counter Z by the clock-pulse. Subsequently, the counter counts forward at the measured frequency $f_i$ until the prescribed value is reached and the described process is repeated. Time intervals and pulse trains proportional to the control deviation are produced at the outputs $A_{R1}$ and $A_{R2}$, respectively. With a constant control deviation, the contents of the difference counter Z in the steady state vary with time in the manner shown in principle in FIG. 2b.

When the counter reaches the prescribed value simultaneously with the appearance of a time-base pulse or when the time-base pulse appears after the counter has reached the prescribed value but before the appearance of a further pulse at the measured frequency $f_i$, no output signal is produced. In the first case, the trigger circuit $FF_1$, which is prepared by the time-base pulse, and the trigger circuit $FF_2$, which is prepared through $G_S$ by the counter reaching the prescribed value and by $\overline{FF_1}$, are simultaneously caused to change condition. Then the resetting to zero of the counter Z and the return of the trigger circuit $FF_2$ are prepared through $G_A$ and the return of the trigger circuit $FF_1$ is directly prepared by the counter reaching the prescribed value. The gate $G_{R1}$ is not opened because the output of $G_N$ is at "0" potential. Simultaneously with the resetting to zero of the counter Z, the trigger circuits $FF_1$ and $FF_2$ are reset to their initial condition, the trigger circuit $FF_3$ is caused to change condition and returns to the initial condition on the appearance of the next clock-pulse. In the second case, the trigger circuit $FF_2$ is caused to change condition, as is $FF_1$, but the latter only after the application of the time-base pulse. Then the trigger circuits are reset to the rest condition and the counter Z is reset to zero, in the same manner as described with reference to the first case.

If the prescribed value zero is preset in the preselection device SE, only positive control deviations can occur since negative frequencies cannot exist physically. Starting from the initial condition of the trigger circuits, which is shown, and with the counter being at zero, the trigger circuit $FF_2$ is prepared through $G_S$ and caused to change condition. If no measured-frequency pulse is received before the appearance of the time-base pulse, the trigger circuits are caused to change condition in a manner similar to that of the above described case in which the time-base pulse appears after the prescribed value has been reached and before a further pulse at the measured frequency is received. If there is a deviation however, the trigger circuit $FF_1$ is caused to change condition, i.e. to leave the rest condition, and hence $G_{R1}$ is opened, after which the counter counts backwards at the difference frequency $f_{p/2}-f_1$ until it reaches the prescribed value zero. Then the trigger circuits $FF_1$ and $FF_2$ are reset to the rest condition. Since the counter still is at the prescribed value, the next clock pulse immediately causes $FF_2$ to leave the rest condition, so that after the next time-base pulse, when pulses of measured frequency are counted, the counter again counts backwards at the difference frequency $f_{p/2}-f_1$.

A drawback of the control system shown in FIG. 3 is that in order to allow for a positive deviation of, for example, 100% the counting capacity of the difference counter Z must be twice the maximum prescribed value $Z_S$ max, and that it is not the counter contents reached at the sampling instants but their respective differences from the preset prescribed value which is approximately proportional to the deviations.

FIG. 4 shows an embodiment of a control system according to a further development of the invention, which obviates these drawbacks and is designed for synchronous operation. The pulses at the measured freqeuncy (measured quantity) $f_1$ which are synchronized with the clock pulse are applied to the input $E_{f1}$, with the bistable trigger circuits $FF_T$, $FF_O$ and $FF_P$ in the rest-condition, as shown, the pulses pass through the and-gate $G_{R1}$ and the summation device S to reach the backward input $E_{AR}$ of the anticoincidence element A preceding the difference counter Z. The counter counts backward from the preset prescribed value to zero. When the measured frequency $f_1$ is smaller than its prescribed value $f_s$, the difference counter Z has not yet reached zero when a synchronized sampling pulse produced by the time base T is received. The clock-pulse which is coincident with the sampling pulse cause the circuit $FF_T$ to change its condition, so that the bistable trigger circuit $FF_P$ is triggered from the output $C_T$, and the and-gate $C_{AT}$, which has been prepared through the inverter stage N, is opened. Through the and-gate $G_{AP}$ pulses at the frequency $f_o=f_{p/2}$ reach the output $A_P$ and are applied to the summation device S. The difference counter continues counting at a frequency corresponding to the sum $f_{p/2}+f_1$. When the counter reaches zero, this is detected in the gate $G_O$ and causes through the inverter stage N the gates $G_{AT}$ and $G_{AP}$ to be blocked and the trigger circuit $FF_T$ to be returned to the initial condition, and through the and-gate $G_{TR}$ and the preselection device SE the counter to be set by the clock pulse to the prescribed value $Z_S$ preset in SE. If the counter reaches zero at the same time as the appearance of an output pulse of the summation device S produced by the measured frequency $f_1$, this pulse must be intermediately stored and introduced into the difference counter to be counted backwards after the counter has been preset. The intermediate storage is effected in the summation device S, to which the output signals of the gate $G_{TR}$ are applied through a control input. After the difference counter Z has been preset, the pulses of measured frequency $f_1$ only are counted backward, until on the appearance of the next sampling pulse the described cycle is repeated. With a constant control deviation the contents of the difference counter Z in the steady state vary with time in the manner shown in principle in FIG. 5a.

We will next consider the case that the measured quantity $f_1$ is greater than its prescribed value $f_s$. Again the bistable trigger circuits are assumed to be in the rest condition shown and the difference counter Z to be at the preset value $Z_S$. When, now, the pulses of the measured frequency $f_1$ are introduced into the counter through $E_{f1}$, $G_{Ri}$, S and A and counted, the counter reaches zero before a sampling pulse is received. Through the gates $G_O$ and $G_{TV}$, the change in condition of the trigger circuit $FF_O$ by the clock pulse is prepared. Subsequently the gate $G_{Ri}$ is in the closed condition and the gate $G_{V1}$ is open so that the pulses at the measured freqeuncy $f_1$ are applied to the forward input $E_{AV}$ of the anticoincidence element A. The difference counter Z continues counting forward. The reception of a sampling pulse produced by the time base T results in the circuit $FF_T$ to be reversed by the clock-pulse, so that the trigger circuit $FF_P$ is triggered and the and-gate $G_{AT}$, which has been prepared by the inverter stage N, is opened. Subsequently pulse signals at the frequency $f_o=f_{p/2}$ produced by $FF_P$ are applied through the gate $G_{AP}$ to the output $A_P$ and through the summation device S and the anticoincidence element A to the backward input $E_R$ of the difference counter Z. Since $f_o$ is greater than $f_1$, the difference counter Z counts backward according to the frequency $f_o-f_1$. When the counter reaches zero, this is detected in the gate $G_O$. This gate blocks the gates $G_{AT}$ and $G_{AP}$ through the inverter stage N and causes $FF_T$ and, through the gate $G_{TR}$, $FF_O$ to return to the initial condition and, through $G_{TR}$ and the preselection device SE, cause the counter Z to be set to the prescribed value $Z_S$ by the clock pulse. Subsequently the pulses at the measured frequency $f_1$ alone are counted backward, and when the counter reaches zero the described cycle is repeated. With a constant control deviation the counter contents vary with time in the manner shown in FIG. 5b in the steady state.

If the counter reaches zero simultaneously with the appearance of a pulse at the measured frequency $f_1$, this pulse must be prevented from being directly applied to the difference counter Z and therefore must be intermediately stored to be introduced into the difference counter Z and counted backward after the counter has been preset. For this purpose the and-gate $G_{K1}$ detects the coincidences of the output signals of the gates $G_{TR}$ and $G_{V1}$. The output signals of $G_{K1}$ are applied to the blocking input $E_{AS}$ of the anticoincidence stage A to block the counter inputs and to the summation device S to be intermediately stored.

Time intervals which are proportional to the respective amounts of the control deviations in the steady state, are available at the output $A_t$ of the gate $G_{AT}$, as are pulse trains at the output $A_P$ of the gate $G_{AP}$. In addition, as FIG. 5 shows, in the steady state the value $Z_a$ reached by the difference counter Z at the respective sampling instant is approximately proportional to the amount of the control deviation:

$$Z_a = (f_1 T - Z_S)(1 \pm f_1/f_o)$$

This approximation is the better, the greater $f_o$ is chosen. The signs of the output signals are determined by the condition of the trigger circuit $FF_O$. "1" potential at the output $\overline{C}_O$ means "the control deviation is positive" and "1" at the output $C_O$ means: "the control deviation is negative."

When the sampling pulse produced by the time base appears simultaneously with the counter reaching zero owing to a pulse at the measured frequency $f_1$, or subsequent thereto but prior to the appearance of a further measured-frequency pulse, no output signal is delivered. In this case, the trigger circuits $FF_O$ and $FF_T$, which are in the rest condition and are prepared through $G_O$ and $G_{TV}$ and by the sampling pulse, respectively, are simultaneously or consecutively reversed. Since the reading of the difference counter remains unchanged, the trigger circiuts $FF_O$, which has been prepared through $G_O$ and $G_{TR}$, and $FF_T$, which has been prepared through $G_O$, are simultaneously returned to the initial condition by the clock pulse, the difference counter Z, which has been prepared through $G_O$, $G_{TR}$ and SE, being preset to the prescribed value $Z_S$. The "1" potential which in the meantime is set up at the output $C_T$ of the trigger circuit $FF_T$ does not cause the production of output signals at the outputs $A_t$ and $A_p$ since the gate $G_{AT}$ is simultaneously blocked through the inverter stage N.

When the prescribed value zero is preset in the preselection device SE, the initial conditions of the bistable trigger circuits are different, the difference from the initial conditions shown in the figure being that the output $\bar{C}_O$ of the trigger circuit $FF_O$ is marked in the initial condition. Hence, the pulses at the measured frequency $f_i$, which in this event always mean a positive control deviation, are applied through the gate $G_{Vi}$ to the forward input $E_{AV}$ of the anticoincidence element A preceding the difference counter. The change in condition of the trigger circuit is effected after reception of the sampling pulses produced by the time base T, as has been described hereinbefore for the case of a positive control deviation.

The operation of the summation device S will now be described with reference to the circuit diagram shown in FIG. 6. The summation device comprises a bistable trigger circuit FF and the nor elements $N_1$, $N_2$ and $N_3$. The pulses at the measured frequency $f_i$ are applied to the input $E_{fi}$, the pulses at the frequency $f_o = f_{p/2}$ to the input $E_{fo}$ and the zero-setting pulses for the counter Z to the input $E_{GA}$. The bistable trigger circuit FF, which initially is in the rest condition, is caused to change this condition by each clock pulse which coincides with the pulse applied to the input $E_{fi}$. When no coincident pulse appears at $E_{fo}$ and/or $E_{GA}$, the trigger circuit FF is returned to the rest condition by the next clock pulse, so that the input pulse appears at the output C of the trigger circuit and, through $N_2$ and $N_3$, at the output $A_V$ with a delay of one pulse period. For the output C and the input $E_{fo}$, the two nor elements $N_2$ and $N_3$ constitute an or-function, that is to say, the sum of the pulses at C and $E_{fo}$ appears at the output $A_V$ when these pulses do not coincide. When an output pulse at C coincides with an input pulse at $E_{fo}$, the trigger circuit FF is prevented through $N_1$ from being returned to the rest condition by the clock pulse following the pulse at $E_{fi}$, and it can only be returned to the rest condition by the clock pulse following the pulse at $E_{fo}$. At the outputs C and $A_V$ a pulse of twice the clock pulse period is produced, which is counted as two discrete pulses by the associated synchronous counter.

Through $N_1$, input pulses at $E_{GA}$ which coincide with output pulses at C act upon the trigger circuit FF in the same manner as the pulses at $E_{fo}$, however, through $N_3$ they erase the coincident portion of the double pulse produced at C. In this case, the pulse associated with the input pulse at $E_{fi}$ appears at the output $A_V$ after the zero-setting pulse for the counter Z controlled by $A_V$ is applied to $E_{GA}$.

What is claimed is:

1. A control system using frequency and time proportional signals wherein measured quantities are represented by frequency-analogous signals and the prescribed quantities are preset and/or introduced in the form of digits for the processing of measured and described quantities for producing time intervals proportional to control deviations between measured and prescribed quantities in accordance with sampling intervals, comprising a time base pulse source for determining the sampling time and providing a series of pulses directly applied to one preparing input of a first bistable trigger circuit having first and second preparing inputs, the second preparing input of said first flip-flop being connected to the output of a preselection device, said preselection device containing the prescribed values and controlled by the output of a difference counter, means coupling the outputs of said first bistable trigger circuit to an input of each of a first and second AND gate, said AND gates further receiving an input from the output of said preselection device, means coupling the outputs of each of said AND gates to respective inputs of a second bistable trigger circuit having complemental outputs, means connecting one of said first trigger circuit outputs to a preparing input of a third bistable trigger circuit thereby producing from said third trigger circuit a frequency one-half of the clock pulse frequency, and to an input of each of a third and fourth AND gate, said third and fourth gates each responsive to the respective outputs of the second bistable trigger circuit, a reset to zero line coupled to said counter, a NAND gate coupling the output signals of said third bistable trigger circiut and the reset-to-zero signal from said reset to zero line, to a further input of said third and fourth AND gates the outputs of said latter AND gates coupled to the respective inputs of fifth and sixth AND gates, the inputs of which are together connected to the output of said third bistable trigger circuit, said latter output marked in the rest condition, means applying the output signals of said fifth AND gate directly to a first input of an anticoincidence element, means coupling the output of said sixth AND gate to a summation device, said summation summing said sixth AND gate output and said measured frequency, and responsive to a reset to zero signal from said reset to zero line for producing a summation output, said summation output coupled to a second input of said anticoincidence device, said first input of said anticoincidence device coupling a forward counting input to said counter, said second input of said anticoincidence device coupling a backward counting input to said counter, said reset-to-zero signals being supplied by said first AND gate the input of which is connected to said first output of said first bistable trigger circuit and to the output of said preselection device.

2. The combination of claim 1, said summation device comprising a fourth synchronous trigger having a first input receiving said measured quantity rate signal, a second input coupled to the output of a first NOR gate, said NOR gate having a first input responsive to said third trigger means output signal and a second input responsive to said reset signal, a second NOR gate having a first input responsive to said second means output signal and a second input responsive to the output of said fourth trigger circuit, and a third NOR gate having a first input coupled to the output of said second NOR gate and a second input responsive to said reset signal and an output, said latter output being coupled to said counter.

3. A control system for providing an indication of control deviation between a prescribed and measured quantity comprising a counter, said counter set to said prescribed value, means coupling said measured value to said counter, said counter thereafter counting backwards from said prescribed value towards zero at a first rate, second means responsive to a sampling signal for causing said counter to count toward zero at a second rate, third means responsive to a zero count in said counter for blocking said second means and for resetting said prescribed value in said counter, the duration between said sampling signal and said zero counter state representing said control deviation.

4. A synchronous system operative under a predetermined clock pulse rate for providing an indication of control deviation between a prescribed and a measured quantity rate signal comprising a counter, a selection circuit for setting said counter to said prescribed quantity, first means applying said measured quantity to said counter whereby said counter counts toward zero at said measured quantity rate, a first synchronously operative trigger circuit responsive to a sampling pulse for changing from an initial condition to a complementary condition, a second synchronously operative trigger circuit coupled to said first trigger circuit and responsive to said change of condition for providing an output signal at one-half the synchronous clock pulse rate, second means coupling said second trigger circuit output to said first means whereby said counter continues to count toward zero at a modified rate determined by the sum of said second trigger circuit output signal rate and said measured quantity rate, third means coupled to said counter and responsive to a zero condition therein for providing an output signal, said third means output being connected to an input of said first trigger circuit, fourth means coupling the output of said third means to said second means, said fourth means responsive to said third means output signal for blocking passage by said second means of said second trigger circuit output signal to said first means, fifth means coupled to the output of said first trigger circuit, said fifth means responsive to said first trigger circuit initial condition and to said third means output signal for providing a first output condition, said fifth means responsive to said first trigger circuit complemental output and to said third means output signal for providing a second output condition, said fifth means output coupled to the input of said first means, said first means responsive to said first output condition for causing said counter to count forward from zero at said measured quantity rate, said first means further responsive to said second output condition for coupling both said second trigger circuit output and said measured quantity rate to said counter whereby said counter counts toward zero at a modified rate determined by the difference between said second trigger circuit output signal rate and said measured quantity rate, said fifth means responsive to said third means output and the complemental output of said first trigger for providing a reset signal, said selection circuit responsive to said reset signal for resetting said counter to said prescribed quantity, said first trigger circuit responsive to said third means output signal for changing from said complementary condition to said initial condition, and said first means further responsive to the simultaneous occurrence of a further measured signal and said reset signal for blocking the input to said counter and to store said further measured signal until the termination of said reset signal whereby said further measured signal is then counted in said counter, the duration between said sampling pulse and said zero count providing said control deviation.

5. A control system as claimed in claim 4 wherein said first means includes a summation device for producing said modified rate, said summation device comprising a third synchronous trigger having a first input receiving said measured quantity rate signal, a second input coupled to the output of a first NOR gate, said NOR gate having a first input responsive to said second means output signal and a second input responsive to said reset signal, a second NOR gate having a first input responsive to said second means output signal and a second input responsive to the output of said third trigger circuit, and a third NOR gate having a first input coupled to the output of said second NOR gate and a second input responsive to said reset signal and an output, said latter output being coupled to said counter.

References Cited
UNITED STATES PATENTS 3,391,275 7/1968 Bullock et al. _____ 235—151.1
3,427,442 2/1969 Sklaroff _____ 235—151.1

THOMAS A. ROBINSON, Primary Examiner

U.S. Cl. X.R.

235—151.1